HIGH SPEED TELEGRAPH SYSTEM

Filed Feb. 1, 1954

4 Sheets-Sheet 1

INVENTOR

Ivan Willard Conrad,

BY

John B. Brady

ATTORNEY

Aug. 30, 1960 I. W. CONRAD 2,951,119

HIGH SPEED TELEGRAPH SYSTEM

Filed Feb. 1, 1954 4 Sheets-Sheet 2

INVENTOR

Ivan Willard Conrad,

BY

John B. Brady

ATTORNEY

HIGH SPEED TELEGRAPH SYSTEM

Filed Feb. 1, 1954 4 Sheets-Sheet 3

INVENTOR

Ivan Willard Conrad,

BY

John B. Brady

ATTORNEY

Aug. 30, 1960 I. W. CONRAD 2,951,119

HIGH SPEED TELEGRAPH SYSTEM

Filed Feb. 1, 1954

4 Sheets-Sheet 4

INVENTOR

Ivan Willard Conrad,

BY

John B. Brady

ATTORNEY

United States Patent Office 2,951,119

Patented Aug. 30, 1960

2,951,119

HIGH SPEED TELEGRAPH SYSTEM

Ivan Willard Conrad, 810 Crescent Drive, Alexandria, Va.

Filed Feb. 1, 1954, Ser. No. 407,378

28 Claims. (Cl. 178—15)

The present invention relates to high speed printing telegraphy and has for its principal object to provide simple, practical, extremely high speed means for recording at a receiving station characters such as the alphabet, numerals, or other symbols selected at a sending station.

Essentially, my present invention comprises improvements which I have made in the high speed character recording systems disclosed in my Letters Patents No. 2,178,989 of November 7, 1939, for System of Telegraphy, and No. 2,248,522, of July 8, 1941, for Automatic Telegraphy, in order to increase the speed of recording and in order to better adapt said recording systems for high speed computer application. It is noted that in Letters Patents No. 2,178,989 and No. 2,248,522, supra, and in the present application, the word "electrodic" is used to describe the nature of certain characters and other components which comprise electrodes. Webster's Collegiate Dictionary, 5th Edition, page 493 defines the suffix "-ic" as forming adjectives denoting "consisting of, characterized by —," thus as used by applicant, "electrodic" means "consisting of or characterized by electrodes." While the characters to be recorded can be selected manually, as by keyboard, preferred selection is by electro-mechanical or electronic means, as by perforated control tape, output of electronic digital computers, and the like.

Primarily the improvement in speed of recording is achieved by completing the recording of one or more entire lines of material within the same time interval required for printing a single complete character under the disclosure of my Letters Patents No. 2,178,989 and No. 2,248,522, supra. Achievement of this objective thus permits an improved "page printer" result. It is noted that the disclosures of my aforesaid Letters Patents No. 2,178,989 and No. 2,248,522 permitted the instantaneous recording of a single complete character, first by eliminating from the recording action all mechanical inertia, otherwise inherent in "stop-start" or other types of printers employing accelerated mechanical components, such as selector relays in the recording process, and, secondly, by employing in the recording process only effects and phenomena associated with the flow of electric current in some form, that is, the phenomena generally encompassed in the term "electronic" or "electronic action." It is emphasized that in no case is a single character recorded by a time sequence of individual points, but that all points necessary to outline the desired character are recorded simultaneously.

With the foregoing general object in view, the invention consists in the novel combinations and arrangements of features as will be hereinafter more fully described, illustrated in the accompanying drawings, and defined in the appended claims.

In the accompanying drawings, wherein are illustrated different practical embodiments of the invention and wherein like characters of reference denote corresponding parts in related views.

Figure 1:
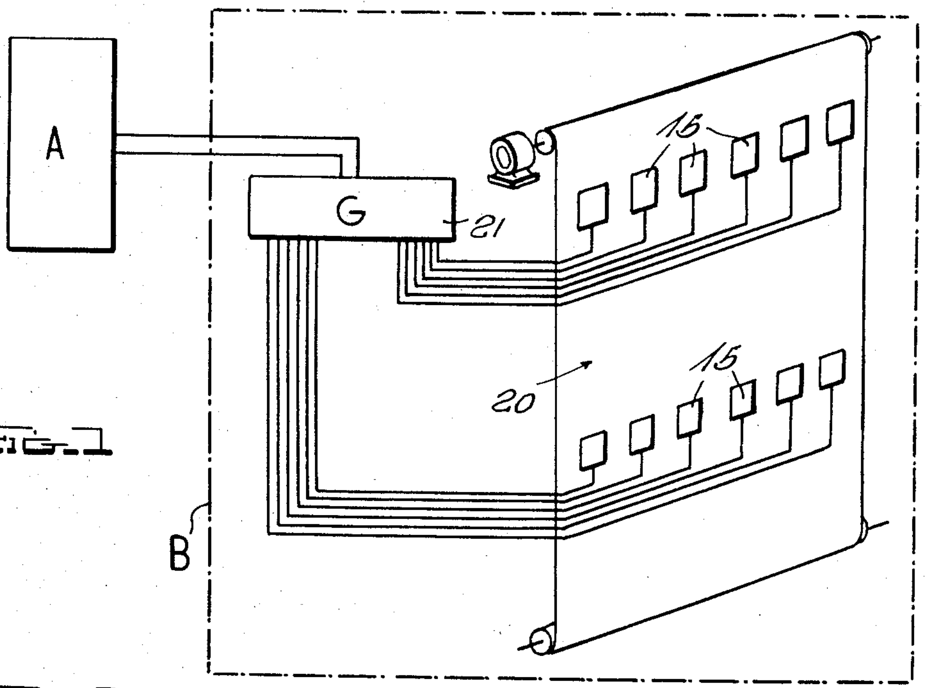
Figure 1 is a diagrammatic view illustrating the general principle of the invention.

Referring to the drawings in detail, and specifically to Fig. 1, A and B designate generally and respectively sending station and page printer receiving station mechanisms, including character recording medium 20 and recordable characters 15. In accordance with the invention, recordable characters 15 are disposed in rows, each row for example being capable of recording a complete single line of recorded information. Although for the sake of clarity only two such rows are illustrated, it will be apparent that as many such rows as desired may be used. The recording medium 20 is advanced, either intermittently or continuously in a direction substantially normal or having a component normal to the lines of recorded information, in order to permit recording of additional lines of information. G designates a plurality of recording energy generators, each individual generator being designated as 21.

Figures 2, 3:
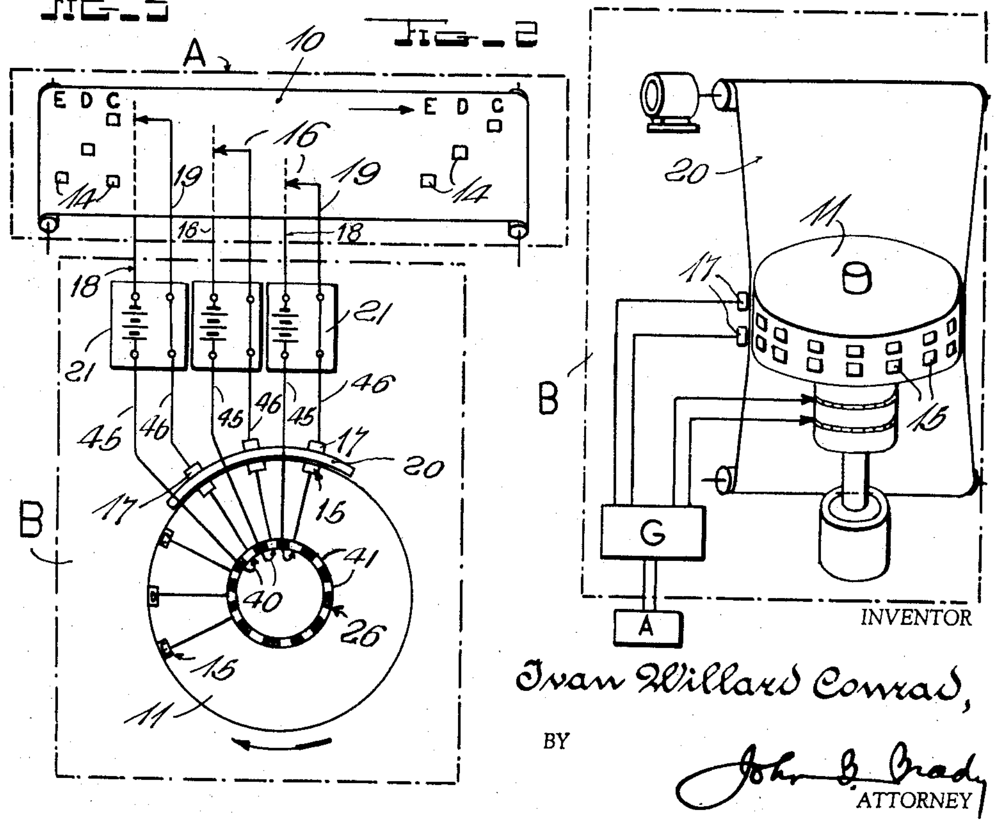
Fig. 2 is a front elevation illustrating one practical embodiment of the invention.
Fig. 3 is a diagrammatic view of the sending and receiving station mechanism shown in Fig. 2.

In Fig. 2 is illustrated one practical embodiment of the invention wherein the recordable characters 15 are disposed on the surface of a rotatable cylindrical element 11 in circumferential rows, and the movable recording medium 20 is caused to conform to a portion of the cylindrical surface of said element 11. Thus the line of recorded information is substantially at right angles to the axis of the cylinder. According to this embodiment, the characters 15 are in the form of electrodes and cooperate with a series of fixed electrodes 17 in such a manner that the characters 15 successively move past electrodes 17. Recording medium 20 is disposed between characters 15 and electrodes 17. Any suitable means responsive to the control of sending station A may be provided to effect recording of a given related character 15 at the instant of its alignment with a cooperating electrode 17. One such means is shown in Fig. 3, from which figure it will be observed that sending station A consists of a movable element 10 which carries coded storage elements 14 comprising in coded form the information to be recorded at station B. In this embodiment, the movement of movable element 10 is synchronized in any suitable, well known manner, as by synchronous motors, common mechanical linkage, or the like, with the movement of rotary element 11. The use of synchronous motors to effect such synchronized movement between elements 10 and 11 is illustrated, for example, in Figs. 1 and 3 of my Letters Patent 2,178,989, supra. Sensing elements 16 responsive to coincidence in position with coded elements 14 are provided and connected to individual recording energy generators 21 by leads 18 and 19. The outputs of respective generators 21, in turn, are connected by leads 45 through individual stationary brushes 40 and commutator segments 41 to related characters 15. Although the characters 15 may be of any desired shape, representative letters of the alphabet are shown spaced around the periphery of rotary element 11 at C, D and E, by way of illustration. Each such electrodic character may consist of a single conducting outline as shown at C, D and E on rotary element 11 of Fig. 3, or, alternately, may consist of a series of spaced conducting electrodes as shown at Z, for example, in Fig. 7, and as described in more detail hereinafter. Suitable electrodic characters are also described in my Letters Patent 2,248,522, supra. The commutator segments 41 and the brushes 40 are made narrow in the circumferential dimension to insure accurate positioning of characters 15 at the instant of recording. Similarly each sensing element 16 and its related generator 21 is connected to an individual cooperating electrode 17 by lead 46. The segments 41 constitute a commutator ring 26.

Although other arrangements are readily possible, in the arrangement shown in Fig. 3 the alpha-numerical or other sequence of coded character storage elements 14 is disposed along the direction of travel of element 10, as at C, D, E, and the relative position of a given character in the line of recorded information is determined by the relative position of the corresponding storage element 14 along a line at right angles to the direction of travel of element 10. Thus activation of any given sensing element 16 by a coded storage element 14 corresponding to a desired character, as for example the letter C, will by virtue of the substantially synchronous movement of elements 10 and 11, cause the character C to be recorded on medium 20 at a position in the line of recorded information corresponding to the sensing element activated. It will thus be observed that with the complete sequence of desired characters spaced around the periphery of rotating element 11, each such character will completely scan a given printing line, once per revolution of element 11. In this manner one complete line of printed information can be produced by each row of characters at each revolution of element 11, since each character can be recorded at any desired point in said line.

Figure 4:
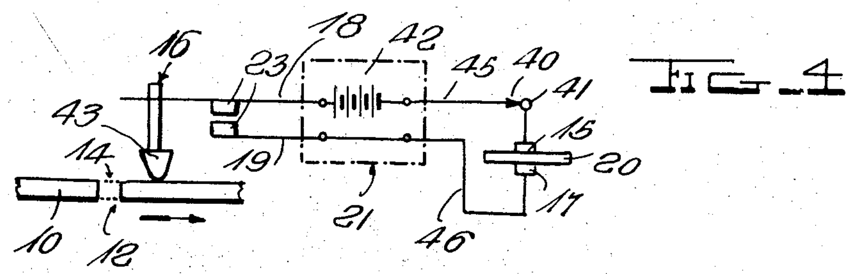
Fig. 4 is a diagrammatic view of the sensing control elements and recording energy generators shown in Fig. 3.
Figures 5, 6, 9:
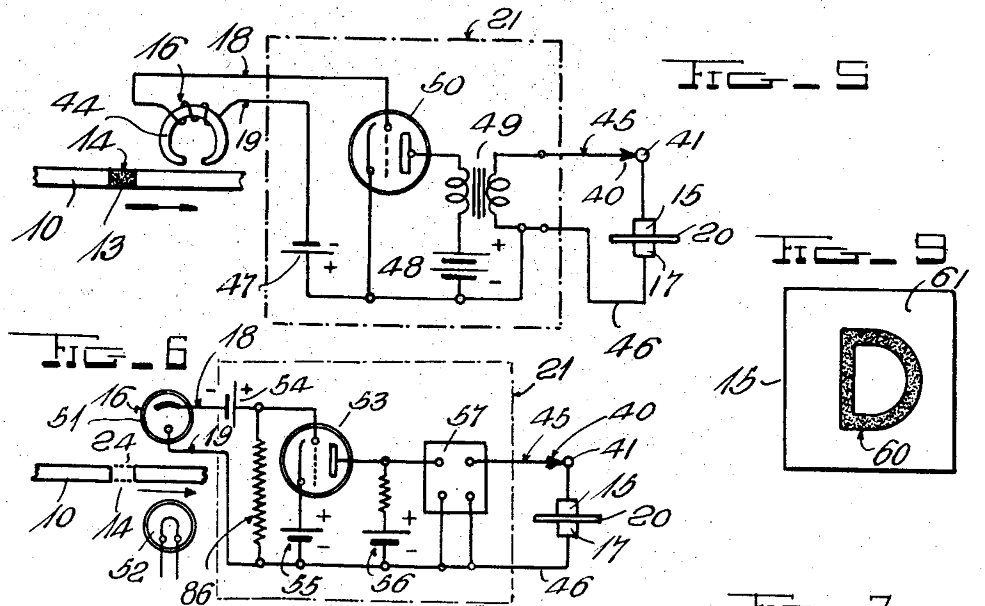
Figs. 5 and 6 are diagrammatic views illustrating alternative forms of sensing control elements and recording energy generators which may be used in lieu of the sensing element and generator shown in Fig. 4.
Fig. 9 is a side elevation of a recordable character illustrated diagrammatically in Fig. 8.

Figs. 4, 5, and 6 illustrate respectively different alternative practical forms of sensing elements 16 together with appropriate cooperating coded storage elements 14, and appropriate recording energy generating means 21, suitable for use in the system shown in Fig. 3. Referring to the embodiment illustrated in Fig. 4, considered in relation to Fig. 3, movable sending element 10 is an insulating tape; coded storage elements 14 are indentations or perforations 12 in said element 10; sensing element 16 includes a cam 43 mechanically linked to a pair of electric contacts 23 in such manner that when sensing cam 43 is riding on uncoded portions of element 10, contacts 23 are open, and when cam 43 is coincident with coded storage perforation 12, contacts 23 are closed; one of said contacts 23 is connected by leads 19 and 46 to an individual cooperating electrode 17; the other of said contacts is connected by lead 18 to an individual recording energy generator 21 which in this instance consists of a battery or similar source 42 of electric current. Current source 42, in turn, is connected by lead 45 to recordable electrodic character 15 as described for Fig. 3. Recording medium 20 in this instance is any material capable of being affected by electric current flow, and is in contact with electrode 17 and electrodic character 15. Sensitized material suitable for such recording medium 20 is referred to in my Letters Patent 2,248,522, supra. Thus, movement of coded storage perforation 12 into coincidence with sensing cam 43 causes contacts 23 to close, thereby completing an electric circuit through current source 42, cooperating electrode 17, recording medium 20 and electrodic character 15, and thereby recording electrodic character 15 onto medium 20.

Referring to the embodiment illustrated in Fig. 5, in relation to Fig. 3, movable element 10 in this instance is a tape suitable for the retention of magnetically recorded impulses, as for example any of the well known magnetic recording media presently commercially available; coded storage element 14 is a magnetic impulse 13 existing on movable element 10; sensing element 16 consists of a magnetic pickup head 44 of well known type suitable for the production of an electric voltage when activated by passage over magnetic pulse 13; recording energy generator 21 in this instance consists of an electronic vacuum tube 50, associated bias supply 47, plate supply 48 and output transformer 49. The pickup 44 is connected by lead 18 to the grid of tube 50 and by lead 19 through bias supply 47 to the cathode of tube 50. Tube 50 normally is biased substantially to cut-off by bias supply 47. Power supply 48 furnishes plate power to tube 50 through the primary of transformer 49. The output from generator 21 is taken from the secondary of transformer 49, which is connected by lead 46 to cooperating electrode 17, and by lead 45 to electrodic character 15 as described for Fig. 3. Thus tube 50 which is normally non-conducting is caused to become momentarily conductive as a result of passage of magnetic impulse 13 past pickup 44. This action results in the development of a potential across the secondary of transformer 49 and hence between electrode 17 and electrodic character 15, thereby recording character 15 on medium 20. It is obvious that this means is effective either to record by direct contact conduction between electrode 17, medium 20, and character 15 as disclosed in Letters Patent No. 2,248,522 or alternatively by spark discharge through medium 20 between electrode 17 and electrodic character 15 as disclosed in Letters Patent No. 2,178,989 aforesaid.

Referring to the alternative embodiment illustrated in Fig. 6, in relation to Fig. 3, movable element 10 is an opaque tape; coded storage elements 14 are perforations or otherwise transparent areas 24 existing on element 10; sensing element 16 includes a photoelectric cell 51 and a cooperating light source 52 positioned respectively on opposite sides of tape 10, whereby light from source 52 normally is prevented from reaching photo cell 51 by opaque element 10, but whereby the passage of coded storage element transparency 24 between source 52 and cell 51 permits the photo cell to be activated by light from source 52; photo cell 51 in turn is connected by leads 18 and 19 to the input of recording energy generator 21, which in this instance consists of an electronic keyer tube 53 together with associated power supplies 54, 55, and 56, and a keyed source 57 of high frequency high potential electric current. The high frequency output of source 57 is connected by lead 45 to electrodic character 15 as described for Fig. 3, and by lead 46 to cooperating electrode 17. Medium 20 placed between character 15 and electrode 17 is responsive to electrical current. Thus, when photo cell 51 is activated by light from source 52 passing through coded transparency 24, keyer tube 53 which is normally biased to cut-off by bias supply 55 is rendered conductive in a well known manner through the action of supply 54 acting across grid resistor 86, thereby keying high frequency source 57 to produce a burst of high frequency potential between electrodic character 15 and cooperating electrode 17, and to record character 15 on medium 20. Here again it will be apparent that this means is effective to record either by direct contact conduction between electrodic character 15 and medium 20 as disclosed in Letters Patent No. 2,248,522, or alternatively by high frequency corona discharge as disclosed in Letters Patent No. 2,178,989. A suitable high frequency generator for use as element 57 is shown in Letters Patent No. 2,178,989, and many others are well known in the art.

Figures 7, 8:
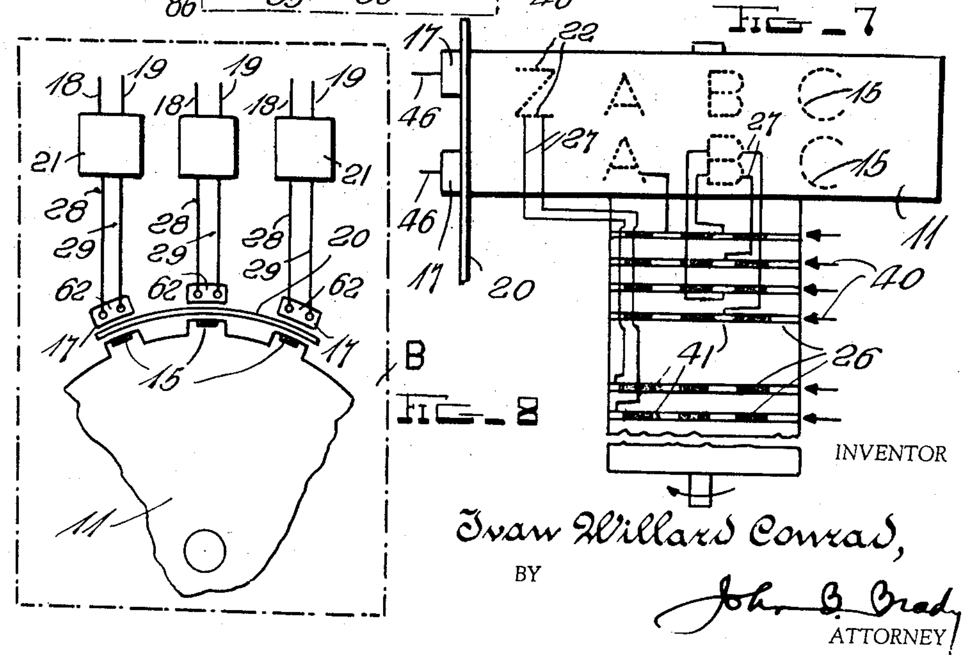
Fig. 7 is a side elevation of the receiving station mechanism diagrammatically illustrated in Fig. 3.
Fig. 8 is a detailed diagrammatic view of an alternate receiving station mechanism suitable for employment of photographic recording means.

Referring next to Fig. 7, wherein is shown a detailed view of the receiving station mechanism illustrated diagrammatically in Fig. 3, it is noted that although some or all of the characters 15 may comprise only a single electrode for cooperation with electrode 17, it is preferred that said characters, except in the cases of such of the same as are relatively small, as commas, periods, and the like, shall be comprised by a plurality of electrodes designated as 22, and that the recording currents between the electrode 17 and the different electrodes 22 shall be distinct from each other, thereby to assure recording of the complete outline of said characters 15. Accordingly, it will be observed that rotating element 11 carries a plurality of commutator rings 26; that there are separate connections 27 between the electrodes 22 comprising any given character 15 and corresponding commutator segments 41 in the plurality of commutator rings 26; and that for each character position in the final line of recorded material, there is an axial series of cooperating fixed brushes 40, one brush for each commutator ring. Of course, some of the characters may be comprised by a greater or lesser number of electrodes 22 than others of said characters. Accordingly, there are as many of the commutator rings as the maximum number of electrodes 22 in any given character 15, so that each electrode of each character may have a connection 27 with a distinct commutator ring. Thus all of the rings 26 may be utilized to provide separate connections for the electrodes 22 of certain of the characters 15, and only some of said rings may be utilized to provide separate connections for the electrodes 22 of others of said characters, depending of course upon the number of electrodes 22 comprising the individual different characters 15. It will further be observed that as illustrated in Fig. 7, a separate row of recordable characters 15, a separate series of commutator rings 26, and a separate row of cooperating electrodes 17 are provided for each line of recorded information which it is desired to record during the same rotation of element 11; while only two such lines are provided for in Fig. 7, it will be apparent that only one might be provided or that more than two might be provided as stated earlier.

Referring again to Fig. 3 in relation to Fig. 7, there is a recording energy generator means 21 individual to each of the brushes 40 to assure a separate current between electrode 17 and each of the electrodes 22 comprising the character being recorded. Since, however, said generator means 21 are, or may be, duplicates of one another, only a few of the same have been illustrated for the sake of clarity and to avoid complicating the illustration.

It is apparent that any suitable means may be used to advance the recording medium 20, as for example mechanical linkage synchronized with the rotation of rotatable element 11, such as a pawl and rachet or other appropriate mechanism.

It will further be apparent that in the case of the alternative embodiments illustrated in Figs. 5 and 6 respectively, wherein the outputs of recording energy generators 21 can result in the production of substantial radiant electromagnetic energy (light), as in the case of recording by spark discharge or by high frequency corona discharge, the recording medium 20 may be chosen to be responsive to such radiant energy rather than responsive to flow of electric current, with the result that characters 15 are recorded on medium 20 photographically, as disclosed in Letters Patent No. 2,178,989.

Moreover, the use of such electromagnetic radiation can offer substantial improvement and simplification under the present invention as reflected by the alternative recordable characters 15, recording medium 20, and cooperating printing electrodes 17 illustrated in Fig. 8. In the embodiment shown therein, a plurality of recording energy generators 21 is provided, each with input leads 18 and 19, suitable for activation by appropriate sensing means, as for example any of the sensing means 16 described in connection with Figs. 3, 4, 5, and 6. The output leads 28 and 29 from each generator 21 are connected to an individual printing electrodic element 17 which in this instance takes the form of a gaseous discharge tube 62 suitably shaped and housed as to illuminate, when activated by the related generator 21, that area of translucent, photographically sensitive recording medium 20 immediately adjacent to said tube 62 and approximately the size of a single character 15. Any of the recording energy generators described in connection with Figs. 4, 5, and 6 are suitable for activation of a gaseous discharge tube 62. Recordable characters 15 in this instance again are disposed in circumferential rows around the periphery of rotating receiving station element 11; however, in this instance the characters 15 are not necessarily electrodic in character, but each character consists of an outline of the desired symbol, which outline is distinguishable from its background by a difference in reflective ability. Referring to Fig. 9 wherein is illustrated such a representative reflective character 15, there is shown at 60 an outline of a representative symbol and the background 61 of said outline, the outline 60 having a different light reflecting ability from that of its background 61. Referring again to Fig. 8 it will be observed that there is provided an individual discharge tube 62 for each character position in the final line of recorded information. Thus upon excitation of a given generator 21 and its related discharge tube 62, under the control of a related sensing element 16 in a manner similar to that discussed in connection with Fig. 3, the said discharge tube will illuminate the immediately adjacent area of recording medium 20 and, through translucent medium 20, that recordable character 15 which at the instant of excitation is aligned with said tube 62. Because of the differing reflective ability of character outline 60 in contrast with its background 61, a photographic recording of said character 15 will thereby be effected on the photographically sensitive medium 20, at the position determined by the individual tube 62. It will be noted that no electrical connections are required to rotating element 11 in this embodiment, in contrast to the plurality of such electrical connections to rotating element 11 required in the embodiments illustrated in Figs. 3, 4, 5, 6, and 7.

Figure 10:
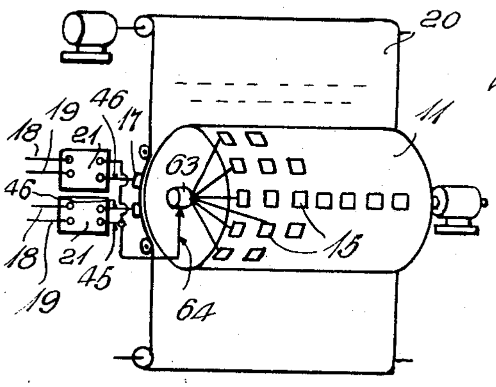
Fig. 10 is a partially perspective view of an alternative receiving station mechanism suitable for use with the sending station means illustrated in Fig. 3.
Figure 11:
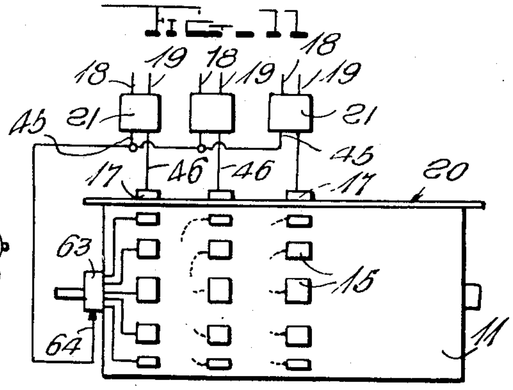
Fig. 11 is a plan view of the receiving station mechanism shown in Fig. 10.

In Figs. 10 and 11 there are illustrated two aspects of still another alternative embodiment of a receiving station mechanism suitable for use with the sending station means depicted in Fig. 3. Referring in detail to Figs. 10 and 11 it will be observed that according to this embodiment, the rows of recordable characters 15 are disposed on the cylindrical surface of a rotatable element 11 in such manner that the alphabets of desired symbols again form circumferential rows, but the lines of recorded information in this instance occur substantially parallel to the axis of the rotating element 11. The movable recording medium 20 is caused to conform to the cylindrical surface for the number of lines of recorded information desired to be recorded simultaneously. Recordable characters 15 in this instance are each formed by a single continuous electrode, and all such characters are electrically connected to rotating contact 63. A plurality of recording energy generators 21 is provided, one for each character position in the final line of recorded information. Each such generator 21 is provided with input leads 18 and 19 for connection to suitable sending station means, as for example that shown in Fig. 3, and similarly each generator 21 is provided with output leads 45 and 46. Lead 46 runs from each generator 21 to an individual related cooperating electrode 17, the plurality of said electrodes 17 forming rows corresponding to the final lines of recorded information. All output leads 45 are joined by a common electrical connection to brush 64 which makes electrical contact with rotating contact 63. Recording medium 20 is responsive to flow of electric current, and as before, is situated between characters 15 and electrodes 17. Recording energy generators 21 suitable for use in this embodiment are shown in Figs. 4, 5, and 6. Thus upon activation of a given generator 21, an electrical current is caused to flow through medium 20 between the related electrode 17 and whatever character 15 that is in alignment with said electrode 17 at the instant of activation, thereby recording said character on said medium. Medium 20 is advanced by any suitable means after the recording of one or more lines of information, as for example through mechanical linkage with rotating element 11. While only characters 15 of single electrode type are shown, it will be apparent that characters formed by a plurality of electrodes, or alternatively characters formed by contrasting light reflecting outlines, may be readily employed in this mechanical embodiment by appropriate circuit modifications similar to those described in connection with Fig. 7 and Fig. 8 respectively.

Figure 12:
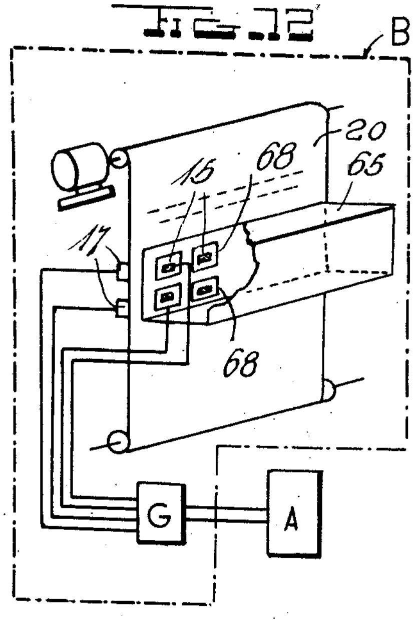
Fig. 12 is an oblique front elevation of still another embodiment of the invention in which non-synchronous means is used for selection of characters to be recorded.

The embodiments illustrated in Fig. 2 through Fig. 11 basically utilize synchronous distributing means at sending and receiving stations for selection of characters. However, other suitable non-synchronous means readily may be employed, as for example, the use of different frequencies, one for each character to be recorded, or alternatively, the use of a cathode ray relay or storage tube with contacts provided and connected to corresponding character recording means, whereby selection is accomplished through appropriate deflection of a cathode ray beam. Fig. 12 illustrates a practical embodiment of the invention, wherein the recordable characters 15 are disposed in parallel lines on the substantially plane surface of a character-holding, stationary matrix 65, and the movable recording medium 20 is caused to conform to said plane surface, selection of characters at receiving station B being carried out by non-synchronous means under the control of sending station A.

Figure 13:
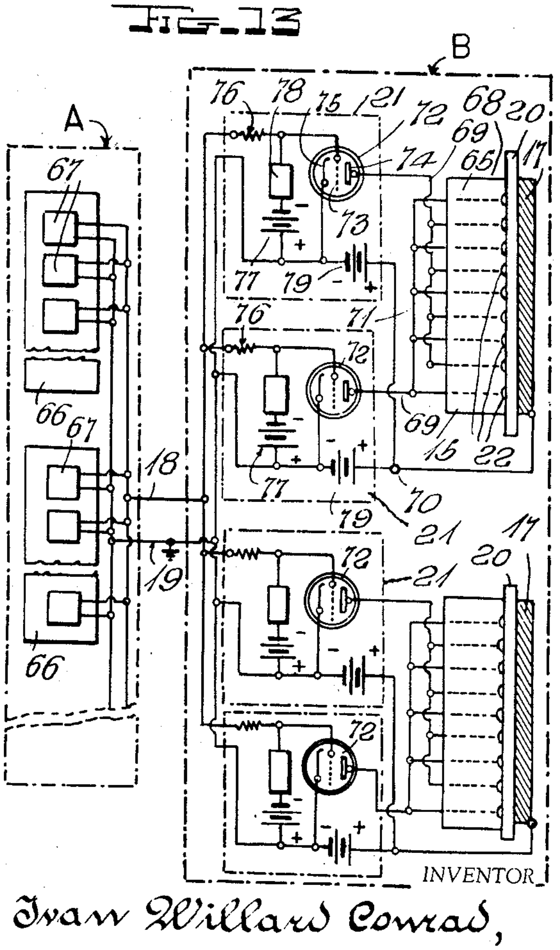
Fig. 13 is a detailed diagrammatic view of the sending and receiving station mechanism shown in Fig. 12.

Referring in detail to Fig. 13 wherein are shown diagrammatically detailed sending station means and detailed receiving station means including recording energy generators 21 and recordable characters 15 suitable for use in the embodiment illustrated in Fig. 12, A and B again represent sending station means and receiving station respectively.

Sending station means A includes a plurality of alternating current signal generator banks 66, as many in number as there are different character positions 68 within matrix 65 of Fig. 12 each bank corresponding to a single position 68. Each signal generator bank 66 in turn includes a plurality of alternating signal generators 67, as many in number as there are individual characters 15 capable of being recorded at the corresponding character recording position 68. Each generator 67 operates on a different frequency and corresponds to a single recordable character 15. The outputs of all generators 67 are connected in parallel and fed to receiving station means B over leads 18 and 19. Receiving station means B, in turn, comprises a plurality of recording energy generators 21, one for each individual character 15 to be recorded. The output of each of said generators 21 is connected by lead 69 to an individual corresponding electrodic character 15, and by lead 70 to a cooperating electrode 17. The said generators 21 are arranged in groups, all such generators within a given group having their output circuits 69 connected to corresponding characters 15 within a single character position 68, and there being as many groups as there are different character positions 68. The recordable characters in this instance consist of elemental conducting areas 22 outlining and partially filling the form of the symbol to be recorded, all elemental areas 22 of any given character being connected together as at 71 and connected to a corresponding lead 69. Interspersed with and surrounding the elemental areas or electrodes 22 of any given character 15 are placed other elemental electrodic areas held in matrix 65 and connected in groups to outline all required characters, each group outlining an individual character 15 and being connected to a different, corresponding recording energy generator 21.

Figure 14:
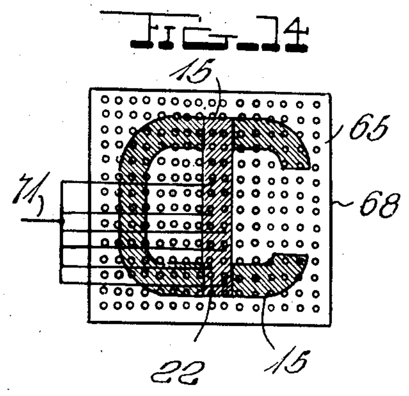
Fig. 14 is a side elevation of a portion of the character matrix shown in Figs. 12 and 13 comprising a single character recording position.

In Fig. 14 is shown one character recording position 68 containing one character 15 with elemental areas connected as at 71 and the manner in which other required characters, only one of which is shown for the sake of clarity, are in effect superimposed in matrix 65, although comprising different electrodic elemental areas. The manner of operation of any single given recording position 68 of Figs. 13 and 14 is similar to that disclosed in my Letters Patent 2,248,522, aforesaid, in respect to character formation. The present disclosure makes possible the simultaneous use of a plurality of such positions to produce one or more simultaneous lines of printed material.

Referring again to Fig. 13, each recording energy generator 21 comprises a vacuum tube 72 having grid 73, plate 74, and cathode 75. The grid 73 is connected to input lead 18 through decoupling resistor 76 and the cathode 75 is connected to input lead 19. Bridged in series between said grid and cathode is bias supply 77 and band-reject filter 78. The plate 74 is connected through output lead 69 to a corresponding electrodic character 15. Cathode 75 is connected through plate supply 79 to a corresponding cooperating electrode 17, the recording medium 20 being placed between said electrode 17 and electrodic character 15. Tube 72 normally is biased to cut-off by bias supply 77. Band-reject filter 78 is designed to offer a high impedance to a narrow band of desired frequencies and negligible impedance to frequencies outside the desired band, the center and width of the desired band being chosen in such manner that filter 78 offers high impedance to the frequency of a single one of signal sources 67 in sending station A, and negligible impedance to the frequencies of all others of said sources 67. Thus upon activation of a given source 67 in any desired manner, as for example under the control of a manual keyboard, automatic tape transmitter, or high speed computing device, a signal of the individual frequency determined by the activated source 67 will be impressed upon circuit lines 18 and 19, and in turn between the grids 73 and the cathodes 75 of all tubes 72 contained in all recording energy generators 21. Because of the action of filters 78 and decoupling resistors 76, the amplitude of the signal effectively reaching grids 73 and cathodes 75 will be negligible for all generators 21 except one, namely the single generator 21 in which the filter 78 offers a high impedance to the impressed frequency. Hence in that generator alone, the plate-cathode impedance of tube 72 will be reduced below cut-off and plate supply 79 will force a recording current through electrode 17, the recording medium 20, the corresponding electrodic character 15, and the tube 72, thereby recording on medium 20 the individual character 15 corresponding to the activated signal source 67 in sending station A.

The position 68 of the recorded character 15 will of course depend upon the bank 66 in which activated signal source 67 was located at the sending station A. It will be apparent that as many of the recordable characters 15 as desired can be recorded simultaneously merely by simultaneous activation of the corresponding sources 67. Ordinarily some or all of the sending station banks 66 would be activated simultaneously, but only one source 67 in each bank would be so activated, thereby recording a single character only in each of the character recording positions 68.

While in Fig. 13 all signals between sending station A and receiving station B are shown passing over a single pair of wires 18 and 19, it will be apparent that an individual and different set of leads 18 and 19 can be provided for each given bank 66, each such different set of leads being connected only to that group of recording energy generators 21 corresponding to the given source bank 66. By thus increasing the number of circuits 18 and 19, the signals from any given bank 66 may be electrically separated from the signals of all other banks; hence, the frequencies of sources 67 in any given bank may be duplicated in all other banks, thereby reducing the number of distinct frequencies required to the highest number of different characters desired to be activated from any given bank 66 and correspondingly recorded in any given character recording position 68.

Figures 15, 17:
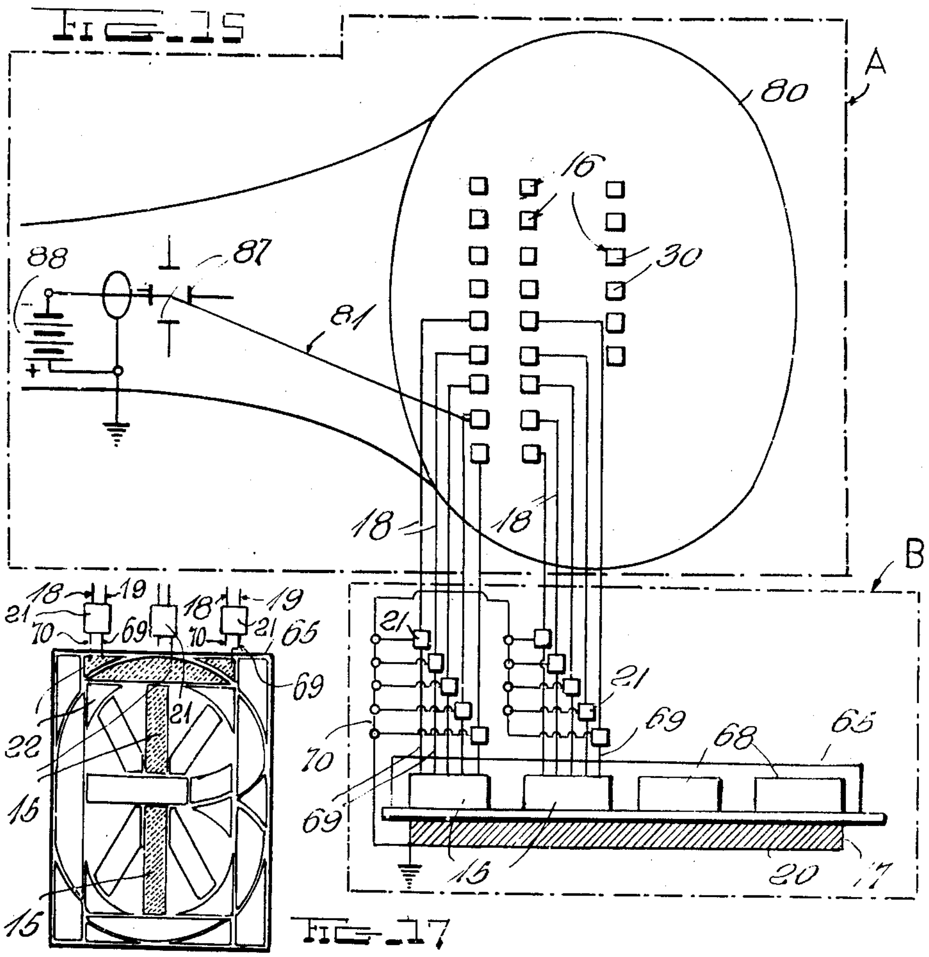
Fig. 15 is a diagrammatic view of an alternative sending and receiving station mechanism suitable for use in the embodiment illustrated in Fig. 12.
Fig. 17 is a diagrammatic view of an alternative character matrix.

Alternatively, as shown in Fig. 17, character matrix 65 may contain relatively large electrodic elements 22, each supplied by an individual recording energy generator 21, selectively grouped to form desired characters 15. Areas shaded indicate manner of such grouping. The operation of any single given recording position as shown in Fig. 17 is similar to that disclosed in my Letters Patent 2,248,522, aforesaid, with regard to forming a desired character outline. The present invention permits simultaneous use of a plurality of such positions for the instantaneous recording of one or more lines of material. The sending station means A of Fig. 13 consisting of a plurality of alternating current signal generators 67, and the recording energy generators 21 of Fig. 13 are directly applicable for use with the character matrix of Fig. 17, the only variation being in the manner of grouping. Thus for example, each signal source 67 when activated will result in the energizing of a single recording energy generator 21 as described for Fig. 13, and hence, in the energizing of the corresponding single element 22 of Fig. 17. Accordingly, any desired character 15 of Fig. 17 may be selected and recorded by activation of the specific plurality of sources 67 corresponding to the plurality of elements 22 making up the desired character. Such activation of sources 67, as before, may be controlled in any desired manner, as for example, by manual keyboard, automatic tape transmitter, high speed computing devices, and the like.

Figure 16:
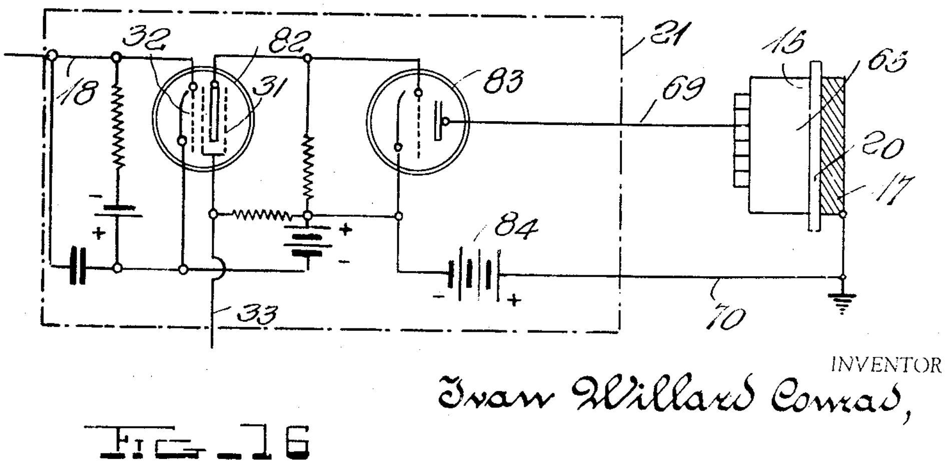
Fig. 16 is a diagrammatic view of the recording energy generator and electrodic characters illustrated in Fig. 15.

In Fig. 15 is shown still another practical embodiment of the invention in which a special cathode ray tube is used as the non-synchronous means of character selection. Referring in detail to Fig. 15, there is shown at 80 a special cathode ray tube having on its face sensing elements 16 responsive to activation by cathode ray pencil 81. Although the sensing elements 16 might take a variety of forms, as for example the form of a capacitor whose charge is affected by the cathode beam, in the present instance for the sake of clarity sensing elements 16 are considered to consist of individual metallic contacts 30, by means of which the negative potential of the cathode beam itself with respect to ground is made directly available at the contact surface when said contact 30 is struck by the impinging cathode ray pencil 81. A separate sensing element 16 is provided for each character to be recorded in each position 68 in the matrix 65, and the elements 16 preferably are arranged in groups, as for example vertical columns, in such manner that all such sensing elements 16 corresponding to the complete symbol alphabet to be recorded at any given recording position 68 are in the same group (column) and a separate group is provided for each separate character recording position 68. Each sensing element 16 is connected by circuit 18 to a corresponding, individual recording energy generator 21, and the various generators 21 are likewise arranged in groups, each group corresponding to an individual recording position 68. The output of each generator 21 is connected by lead 69 to its respective electrodic character 15 and by lead 70 to a cooperating electrode 17. Recording medium 20, in this instance responsive to passage of electric current, is situated between characters 15 and electrodes 17. One form of recording energy generator 21 and associated character recording means suitable for use in the embodiment illustrated in Fig. 15 is shown in detail in Fig. 16, wherein generator 21 consists of a 2 stage directly coupled vacuum tube amplifier comprising tubes 82 and 83 together with their associated bias and plate power supplies. Tube 82 is normally in a conducting state and circuit constants are so chosen as to make tube 83 in a normally non-conducting state. Thus when a given sensing element 16 is activated by the impingement thereon of cathode beam 81, under the control of a manual keyboard, automatic tape transmitter, high speed computing device or the like, the grid of corresponding tube 82 is driven more negative by virtue of its connection 18 with said sensing element. Through the well known action of a two stage direct-coupled amplifier, the grid of tube 83 is made less negative with respect to its associated cathode and tube 83 therefore becomes conducting, whereupon power supply 84 forces a recording current through electrode 17, medium 20, electrodic character 15 and tube 83, thereby recording character 15 on medium 20. Characters 15 in this instance are similar in nature to the characters shown in detail in Fig. 14.

While the circuits shown in Fig. 13 through Fig. 16 make the activation of recording energy generators 21 responsive only to signals coming over circuit 18, and thereby make the printing of a desired character occur substantially instantaneously with the activation of the related generator 21 over lead 18, it will be apparent to those skilled in the art that, in lieu thereof, additional "recording trigger" means may be provided whereby the actual recording of a given character may be delayed until all desired characters forming any given line of recorded information have been selected by the selecting means shown and the corresponding circuits 18 appropriately energized, after which all of the desired characters may be printed simultaneously through appropriate activation of said "trigger" means by a "printing" pulse derived in any suitable manner from sending station A. One such suitable "trigger" means could be derived from control of a second, or screen, grid 31 in vacuum tube 82 whereby said screen grid maintained tube 82 in a conducting state, in spite of the increased negative potential on control grid 32 resulting from activation of the related sensing element 16, until the potential of said screen grid 31 is lowered by a negative "printing" pulse transmitted to said screen grid from sending station A over lead 33, at which time printing of the related character 15 would occur.

Similarly, while the circuits shown in Fig. 13 through Fig. 16 show recording by direct contact conduction through medium 20, it will be apparent to those skilled in the art that recording by spark discharge, recording by high frequency corona, or recording by light controlled or emitted by an electrical discharge, may be equally well utilized in the basic embodiments illustrated therein, through the choice of recording signal generators 21 and the choice of characters 15 suitable for the specific type recording desired, in a manner similar to that described in connection with the embodiments reflected in Fig. 5, Fig. 6, and Fig. 8.

In addition, it will also be apparent to those skilled in the art that a combination of the synchronous and non-synchronous character selection means may at times be employed to advantage. For example the synchronous selection means illustrated in Fig. 3 and the non-synchronous means illustrated in Fig. 13 may be utilized together, whereby non-synchronous selection by frequencies is employed to select the position of the recorded character in the final line of information, and the synchronous means is utilized to select the specific character to be recorded in that position. Such a combination would possess the obvious advantage of permitting transmittal of the entire communications signal over a single circuit, as for example a single pair of wires, between the sending and receiving stations, and yet would not require the large number of individual frequencies otherwise required if the non-synchronous means were used for both selection of characters and recorded position.

In addition, those skilled in the art will recognize that in the case of the embodiment illustrated in Fig. 15, under suitable conditions, as for example, where the interconnecting circuits 18 are not unduly long, the energy transmitted to receiving station B over circuits 18 by cathode ray 81 can be made sufficiently great as to be itself capable of exciting electrodic characters 15 directly, without the assistance of intermediate generators 21. In such a case, each generator 21 in Fig. 15 would degenerate into a straight-through connection from a given lead 18 to its corresponding lead 69 (and output leads 70 would not exist). Thus upon the impingement of cathode ray 81 upon a given sensing element 16 under the control of a manual keyboard, automatic tape transmitter, high speed computing device, or the like driving deflection means 87, cathode ray power supply 88 would force a character-recording current through cathode ray 81, sensing element contact 30, lead 18, related lead 69, related electrodic character 15, recording medium 20, and cooperating electrode 17 to the common return circuit or ground, thereby recording said character 15 onto medium 20. As before, it will be apparent that this modification is also equally applicable to recording by spark discharge from electrodic characters 15 and to photographic recording from light emitted by excited electrodic characters 15, suitable such characters being illustrated in Figs. 14 and17. It will be recognized that it is readily possible to surround such electrodic characters with a gas such as neon within a transparent envelope to facilitate photographic recording.

While the drawings illustrate wire connections between the sending and receiving mechanisms A and B, it is manifest that such connections may readily be replaced by suitable wireless transmitting and receiving devices associated with the sending and receiving mechanisms A and B, respectively, and that it accordingly is within the purview of the invention to employ such devices if desired. Moreover, while only certain specific embodiments of the invention have been illustrated and described to convey the general concept of the invention, it is to be understood that the same is readily capable of various other embodiments within its spirit and scope as defined in the appended claims.

What I claim as new and desire to secure by Letters Patent of the United States is:

1. In a telegraph system, a receiving station page-printer mechanism including a sensitized page-style recording medium; a plurality of character-recording positions spatially disposed along at least one line traversing said medium; primary character-forming means operable under substantial gas pressure, defining a plurality of recordable characters certain of which are different in shape from others of said characters; character-selecting means whereby any one of a plurality of said different characters may be selected to be formed within any one of said character-recording positions by said primary character-forming means, and wherein the respective lengths of time required for selection of certain of said characters may overlap in duration; nonmechanical electronic recording means whereby any one of said characters formed within any one of said character-recording positions may be instantaneously recorded onto said medium by electronically produced non-mechanical recording energy acting on said medium; means for advancing said medium in a direction substantially at right angles to said line of character-recording positions; and means controlling said recording energy and selection of characters to be recorded.

2. In a telegraph system, a receiving station page-printer mechanism including a sensitized page-style recording medium; a plurality of character-recording positions spatially disposed along at least one line traversing said medium; primary character-forming means operable under substantial gas pressure, spatially disposed in at least one row traversing said recording medium substantially parallel to said line of character-recording positions and defining a pluraltiy of recordable characters certain of which are different in shape from others of said characters; character-selecting means whereby any one of a plurality of said different characters may be selected to be formed within any one of said character-recording positions by said primary character-forming means, and wherein the respective lengths of time required for selection of certain of said characters may overlap in duration; non-mechanical electronic recording means whereby any one of said characters formed within any one of said character-recording positions may be instantaneously recorded onto said medium by electronically produced non-mechanical recording energy acting on said medium; means for advancing said medium in a direction substantially at right angles to said line of character-recording positions; and means controlling said recording energy and selection of characters to be recorded to effect selection and recording of a plurality of said characters within a time interval which is substantially less in duration than the sum of the lengths of the individual time intervals required to select and record each individual character comprising said last-named plurality.

3. In a telegraph system, a receiving station page-printer mechanism including a sensitized page-style recording medium; a plurality of character-recording positions spatially disposed along at least one line traversing said medium; primary character-forming means operable under substantial gas pressure, spatially disposed in at least one row traversing said recording medium substantially parallel to said line of character-recording positions and defining a plurality of recordable characters certain of which are different in shape from others of said characters; character-selecting means whereby any one of a plurality of said different characters may be selected to be formed within any one of said character-recording positions by said primary character-forming means, and wherein the respective lengths of time required for selection of certain of said characters may overlap in duration; non-mechanical electronic recording means whereby any one of said characters formed within any one of said character-recording positions may be instantaneously recorded onto said medium by electronically produced non-mechanical recording energy acting on said medium; means for advancing said medium in a direction substantially at right angles to said line of character-recording positions; and means controlling said recording energy and selection of characters to be recorded, whereby the individual time intervals required for selection and recording of individual characters may overlap in duration, thereby reducing the length of the total time interval required for selecting and recording a plurality of said characters along said line to a value substantially less than the sum of the lengths of the individual time intervals represented by the characters comprising said last named plurality.

4. In a telegraph system, a receiving station page-printer mechanism including a sensitized page-style recording medium; a plurality of character-recording positions spatially disposed along at least one line traversing said medium; primary character-forming means operable under substantial gas pressure, spatially disposed in at least one row traversing said recording medium substantially parallel to said line of character-recording positions and defining a plurality of recordable characters certain of which are different in shape from others of said characters; character-selecting means whereby any one of a plurality of said different characters may be selected to be formed within any one of said character-recording positions by said primary character-forming means, and wherein the respective lengths of time required for selection of certain of said characters may overlap in duration; non-mechanical electronic recording means whereby any one of said characters formed within any one of said character-recording positions may be instantaneously recorded onto said medium by electronically produced non-mechanical recording energy acting on said medium; means for advancing said medium in a direction substantially at right angles to said line of character-recording positions; and means controlling said recording energy and selection of characters to be recorded, whereby the individual time intervals required for selection and recording of individual characters may overlap in duration, thereby permitting selecting and recording a plurality of said characters along said line within substantially the same time interval length as the average time interval length required to select and record a single said character.

5. In a telegraph system, a receiving station page-printer mechanism including a sensitized page-style recording medium; a plurality of character-recording positions spatially disposed along at least one line traversing said medium; primary character-forming means operable under substantial gas pressure, defining a plurality of recordable characters certain of which are different in shape from others of said characters; character-selecting means whereby any one of a plurality of said different characters may be selected to be formed within any one of said character-recording positions by said primary character-forming means, and wherein the respective lengths of time required for selection of certain of said characters may overlap in duration; non-mechanical electronic recording means whereby any one of said characters formed within any one of said character-recording positions may be instantaneously recorded onto said medium by electronically produced non-mechanical recording energy acting on said medium; means for advancing said medium in a direction substantially at right angles to said line of character-recording positions; and means controlling said recording energy and selection of characters to be recorded; said primary character-forming means having a constant relationship to said character-recording positions with respect to accelerated physical motion during the selection and recording of said characters within any one of said lines of said character-recording positions.

6. A telegraph system as set forth in claim 1 in which the said primary character-forming means and the said character-recording positions, and the said character-selecting means have a constant interrelationship with respect to accelerated physical motion during the selection and recording of said characters within any one of said lines of said character-recording positions.

7. A telegraph system as set forth in claim 3 in which said non-mechanical electronic recording means includes electromagnetic radiant energy produced by gaseous electronic discharge, said electromagnetic radiant energy acting directly on said sensitized recording medium to effect recording of said characters.

8. A telegraph system as set forth in claim 4 in which said non-mechanical electronic recording means includes electromagnetic radiant energy produced by gaseous electronic discharge, said electromagnetic radiant energy acting directly on said sensitized recording medium to effect recording of said characters.

9. A telegraph system as set forth in claim 3 in which each of certain of said recordable characters comprises a plurality of electrodes having an interfitting relationship to each other so that certain of said electrodes are common to different characters; and in which said non-mechanical electronic recording means includes a separate electronic discharge-producing means for each of said electrodes, and further includes electromagnetic radiant energy acting on said sensitized recording medium.

10. A telegraph system as set forth in claim 3, in which each of certain of said recordable characters comprises a plurality of electrodes connected together and further connected to a separate electronic discharge-producing means individual to each character, the electrodes comprising each character being separate and distinct from the electrodes comprising each other character, and certain of the electrodes comprising certain of said characters being disposed within the outlines of certain other of said characters; and in which said non-mechanical electronic recording means includes electromagnetic radiant energy acting on said sensitized recording medium.

11. A telegraph system as set forth in claim 3 in which each of said recordable characters consists of at least one electrode; and in which said non-mechanical electronic recording means includes electronic discharge from said electrodes to effect recording of selected characters.

12. A telegraph system as set forth in claim 4 in which each of said recordable characters consists of at least one electrode; and in which said non-mechanical electronic recording means includes electronic discharge from said electrodes to effect recording of selected characters.

13. A telegraph system as set forth in claim 3 in which each of said recordable characters consists of at least one electrode; and in which said non-mechanical electronic recording means includes spark discharge from said electrodes to effect recording of selected characters.

14. A telegraph system as set forth in claim 3 in which each of said recordable characters consists of at least one electrode; and in which said non-mechanical electronic recording means includes high frequency corona-type electronic discharge from said electrodes to effect recording of selected characters.

15. A telegraph system as set forth in claim 3 in which each of said recordable characters consists of at least one electrode; and in which said non-mechanical electronic recording means includes means for forcing an electric current through each electrode of a selected character to record said selected characters.

16. A telegraph system as set forth in claim 4 in which each of said recordable characters consists of at least one electrode; and in which said non-mechanical electronic recording means includes means for forcing an electric current through each electrode of a selected character to record said selected characters.

17. A telegraph system as set forth in claim 3 in which each of certain of said recordable characters comprise a plurality of electrodes having an interfitting relationship to each other so that certain of said electrodes are common to different characters; and in which the said non-mechanical electronic recording means includes means for forcing electric current through the electrodes comprising a selected character to record said character.

18. A telegraph system as set forth in claim 3 in which each of said recordable characters comprises a plurality of electrodes connected together, the electrodes comprising each character being separate and distinct from the electrodes comprising each other character, and certain of the electrodes comprising certain of said characters being disposed within the outlines of certain other of said characters; and in which the said non-mechanical electronic recording means includes means for forcing electric current through the electrodes of a selected character to record said character.

19. A telegraph system as set forth in claim 3 in which each of said recordable characters consists of at least one electrode; and in which the said electronic recording means includes an electric current conducted between each of the electrodes of a selected character and the said recording medium by direct contact conduction to record said selected character.

20. A telegraph system as set forth in claim 3 in which each of said recordable characters consists of at least one electrode; and in which the said electronic recording means includes an electric current conducted between each of the electrodes of a selected character and the said recording medium by direct contact conduction to record said selected character, by electrochemical action of said current on said medium.

21. In a telegraph system, a receiving station page-printer mechanism including a sensitized page-style recording medium; a plurality of character-recording positions spatially disposed along at least one line traversing said medium; primary character-forming means operable under substantial gas pressure, spatially disposed in at least one row traversing said recording medium substantially parallel to said line of character-recording positions and defining a plurality of recordable characters certain of which are different in shape from others of said characters; character-selecting means whereby any one of a plurality of said different characters may be selected to be formed within any one of said character-recording positions by said primary character-forming means, and wherein the respective lengths of time required for selection of certain of said characters may overlap in duration; non-mechanical electronic recording means whereby any one of said characters formed within any one of said character-recording positions may be instantaneously recorded onto said medium by electronically produced non-mechanical recording energy acting on said medium; means for advancing said medium in a direction substantially at right angles to said line of character-recording positions; and means controlling said recording energy and selection of characters to be recorded, whereby the individual time intervals required for selection and recording of individual characters may overlap in duration, thereby reducing the length of the total time interval required for selecting and recording a plurality of said characters along said line to a value substantially less than the sum of the lengths of the individual time intervals represented by the characters comprising said last named plurality; said means controlling recording energy and selection of characters including a sending station mechanism comprising a two dimensional matrix surface containing a plurality of discrete coded storage elements and further comprising a plurality of sensing elements positioned adjacent to said matrix surface and movably related thereto and responsive only to selective coincidence with certain of said storage elements; and said recordable characters and said recording positions being related both to said storage elements and to said sensing elements whereby selective coincidence of one of said storage elements with one of said sensing elements uniquely relates a certain one of said characters to a certain one of said character recording positions.

22. A telegraph system as set forth in claim 3 in which the said character-selecting means includes means for selectively moving certain of said characters to any of said recording positions by motion having constant linear speed; and in which the said means controlling recording energy and selection of characters includes a sending station mechanism comprising a two dimensional matrix surface containing a plurality of discrete coded storage elements related to said recordable characters and to said character-recording positions, and further comprising a plurality of sensing elements related to said recording positions and positioned adjacent to said surface and responsive only to selective coincidence with certain of said storage elements; and in which said means controlling recording energy and selection of characters further includes means for moving said matrix surface relative to said sensing elements synchronously with said motion of said characters, whereby upon coincidence of any sensing element with a coded storage element, the related character is recorded in the related character position.

23. A telegraph system as set forth in claim 3 in which said means controlling recording energy and selection of characters includes a sending station mechanism comprising a plurality of discrete signal generators, each such generator being uniquely related to a corresponding one of said recordable characters; and in which said character-selecting means includes a plurality of recording energy generators, each uniquely related to a certain one of said recordable characters and responsive to activation by a certain one of said sending station generators to record the character uniquely related to said last-named certain one of said sending station generators.

24. A telegraph system as set forth in claim 3 in which the said means controlling recording energy and selection of characters includes a cathode-ray sending-station means comprising a cathode ray and a plurality of cathode ray targets each of said targets being uniquely related to a corresponding one of said recordable characters whereby said corresponding one of said recordable characters is recorded whenever said cathode ray strikes the uniquely related cathode ray target.

25. A telegraph system as set forth in claim 21 in which the coded storage elements consist of physical indentations in an otherwise smooth two-dimensional physical surface, and in which the cooperating sensing elements include electrical contacts which are actuated by said indentations.

26. A telegraph system as set forth in claim 21 in which the coded storage elements consist of transparent areas in an otherwise opaque matrix, and in which the cooperating sensing elements include light sources, and photoelectric cells which are activated by said light sources whenever said transparent areas coincide with the paths from light sources to photocells.

27. A telegraph system as set forth in claim 21 in which the coded storage elements consist of magnetized areas in a magnetic matrix together with the resulting associated external magnetic fields, and in which the cooperating sensing elements include magnetic pick-up coils which cut the magnetic flux of said external magnetic fields.

28. A telegraph system as set forth in claim 21 in which the coded storage elements consist of the potentials existing on matrix areas struck by a beam of cathode rays, and in which the sensing elements include electrical components for recovering a portion of said potentials.

References Cited in the file of this patent

UNITED STATES PATENTS

| | | |
|---|---|---|
| 1,725,533 | Lee | Aug. 20, 1929 |
| 2,178,989 | Conrad | Nov. 7, 1939 |
| 2,248,522 | Conrad | July 8, 1941 |
| 2,291,476 | Kernkamp | July 28, 1942 |
| 2,686,222 | Walker | Aug. 10, 1954 |
| 2,736,770 | McNaney | Feb. 28, 1956 |
| 2,777,745 | McNaney | Jan. 15, 1957 |